United States Patent
Muldoon et al.

(10) Patent No.: US 8,318,354 B2
(45) Date of Patent: *Nov. 27, 2012

(54) ELECTROCHEMICAL DEVICE WITH A MAGNESIUM ANODE AND A STABLE, SAFE ELECTROLYTE COMPATIBLE WITH SULFUR

(75) Inventors: John Muldoon, Saline, MI (US); Hee Soo Kim, Ann Arbor, MI (US)

(73) Assignee: Toyota Motor Engineering & Manufacturing North America, Erlanger, KY (US)

( * ) Notice: Subject to any disclaimer, the term of this patent is extended or adjusted under 35 U.S.C. 154(b) by 17 days.

This patent is subject to a terminal disclaimer.

(21) Appl. No.: 12/768,017

(22) Filed: Apr. 27, 2010

(65) Prior Publication Data

US 2011/0262804 A1 Oct. 27, 2011

(51) Int. Cl.
*H01M 10/054* (2010.01)
*H01M 10/056* (2010.01)
*H01M 4/13* (2010.01)

(52) U.S. Cl. .............. 429/231.6; 429/218.1; 429/188; 429/336; 429/337; 429/199

(58) Field of Classification Search .............. 429/188, 429/324, 327, 329–333, 336–338, 209, 218.1, 429/231.6

See application file for complete search history.

(56) References Cited

U.S. PATENT DOCUMENTS

| | | |
|---|---|---|
| 3,658,592 A | 4/1972 | Dey |
| 3,849,868 A | 11/1974 | Jost |
| 4,020,242 A | 4/1977 | Okazaki et al. |
| 5,506,072 A | 4/1996 | Griffin et al. |
| 6,030,720 A | 2/2000 | Chu et al. |
| 6,265,109 B1 | 7/2001 | Yamamoto et al. |
| 6,316,141 B1 | 11/2001 | Aurbach et al. |
| 6,403,253 B1 | 6/2002 | Wainwright et al. |
| 6,420,067 B1 | 7/2002 | Yoshioka |
| 6,713,212 B2 | 3/2004 | Aurbach et al. |
| 6,733,924 B1 | 5/2004 | Skotheim et al. |
| 7,029,796 B2 | 4/2006 | Choi et al. |
| 7,189,477 B2 | 3/2007 | Mikhaylik |
| 7,316,868 B2 | 1/2008 | Gorkovenko |
| 2008/0182176 A1 | 7/2008 | Aurbach et al. |
| 2009/0068568 A1 | 3/2009 | Yamamoto et al. |

(Continued)

FOREIGN PATENT DOCUMENTS

JP 2004-265675 9/2004

(Continued)

OTHER PUBLICATIONS

Doron Aurbach, et al. "Nonaqueous Magnesium Electrochemistry and Its Application in Secondary Batteries" The Chemical Record, vol. 3, (pp. 61-73) 2003.

(Continued)

*Primary Examiner* — Basia Ridley
*Assistant Examiner* — Jacob Buchanan
(74) *Attorney, Agent, or Firm* — Oblon, Spivak, McClelland, Maier & Neustadt, L.L.P.

(57) ABSTRACT

An electrochemical device, having an anode containing magnesium; a cathode stable to a voltage of at least 3.2 V relative to a magnesium reference; and an electrolyte containing an electrochemically active magnesium salt obtained by mixing an organic magnesium compound with an aluminum compound in an ether solvent and separation of the electrochemically active salt from the reaction mixture is provided. The separated electrochemically active salt is stable and safe to handle in comparison to conventional Grignard based electrolyte systems.

8 Claims, 10 Drawing Sheets

U.S. PATENT DOCUMENTS

2009/0226809 A1     9/2009    Vu et al.

FOREIGN PATENT DOCUMENTS

| JP | 2004259650 A | 9/2004 |
|---|---|---|
| JP | 2005-243321 | 9/2005 |
| WO | WO 2009/105359 A1 | 8/2009 |

OTHER PUBLICATIONS

Z. Lu, et al. "On the Electrochemical Behavior of Magnesium Electrodes in Polar Aprotic Electrolyte Solutions" Journal of Electroanalytical Chemistry, vol. 466, (pp. 203-217) 1999.

D. Aurbach, et al. "Prototype Systems for Rechargeable Magnesium Batteries" Nature, vol. 407, (pp. 724-727) 2000, www.nature.com.

C. Liebenow, et al. "The Electrodeposition of magnesium Using Solutions of Organomagnesium Halides, Amidomagnesium Halides and Magnesium Organoborates" Electrochemistry Communications vol. 2, (pp. 641-645) 2000.

Thomas D. Gregory, et al. "Nonaqueous Electrochemistry of Magnesium" J. Electrochem. Soc. vol. 137, No. 3, (pp. 775-780), 1990.

Doron Aurbach, et al. "Electrolyte Solutions for Rechargeable Magnesium Batteries Based on Organomagnesium Chloroaluminate Complexes" Journal of the Electrochemical Society, vol. 149 (2), (pp. A115-A121) 2002.

U.S. Appl. No. 12/758,343, filed Apr. 12, 2010, Muldoon, et al.

International Search Report and the Written Opinion of the International Searching Authority issued Jul. 28, 2011, in PCT/US2011/034083.

Oren Mizrahi, et al., "Electrolyte Solutions with a Wide Electrochemical Window for Rechargeable Magnesium Batteries", Journal of the Electrochemical Society, vol. 155 (2), 2008, pp. A103-A109.

U.S. Appl. No. 13/198,580, filed Aug. 4, 2011, Muldoon, et al.

Nir Pour, et al., "Structural Analysis of Electrolyte Solutions for Rechargeable Mg Batteries by Stereoscopic Means and DFT Calculations" Journal of the American Chemical Society (JACS), 2011, 133, (6270-6278).

Hee Soo Kim, et al., "Structure and Compatibility of a Magnesium Electrolyte with a Sulphur Cathode" Nature Communications 2:427 DOI 10.1038/ncomms1435, www.nature.com/naturecommunicatons, (p 1-6), 2011.

John Muldoon, et al., "Electrolyte Roadblocks to a Magnesium Rechargeable Battery" Energy & Environmental Science, (Dynamic Article Links), The Royal Society of Chemistry 2012, www.rsc.org/ees.

1. Mg reference electrode
2. Working electrode
3. PTFE tube
4. Mg counter electrode
5. Electrolyte
6. S/C paste

ELECTROCHEMICAL DEVICE WITH A MAGNESIUM ANODE AND A STABLE, SAFE ELECTROLYTE COMPATIBLE WITH SULFUR

CROSS REFERENCE TO RELATED APPLICATIONS

This application is related to prior U.S. patent application Ser. No. 12/758,343, filed Apr. 12, 2010, the disclosure of which is incorporated herein by reference.

BACKGROUND OF THE INVENTION

1. Field of the Invention

The present invention relates to an electrochemical device having an anode containing magnesium, a cathode stable to a voltage of at least 3.2 V relative to a magnesium reference; and an electrolyte magnesium salt obtained by mixing a magnesium salt with an aluminum compound in an ether solvent. Most specifically the invention is directed to a magnesium sulfur electrochemical device having a stable and safe electrolyte which is compatible with a magnesium anode and a sulfur cathode.

2. Discussion of the Background

Lithium ion batteries have been in commercial use since 1991 and have been conventionally used as power sources for portable electronic devices. The technology associated with the construction and composition of the lithium ion battery (LIB) has been the subject of investigation and improvement and has matured to an extent where a state of art LIB battery is reported to have up to 700 Wh/L of energy density. However, even the most advanced LIB technology is not considered to be viable as a power source capable to meet the demands for a commercial electric vehicle (EV) in the future. For example, for a 300 mile range EV to have a power train equivalent to current conventional internal combustion engine vehicles, an EV battery pack having an energy density of approximately 2000 Wh/L is required. As this energy density is close to the theoretical limit of a lithium ion active material, technologies which can offer battery systems of higher energy density are under investigation.

Magnesium as a multivalent ion is an attractive alternate electrode material to lithium, which can potentially provide very high volumetric energy density. It has a highly negative standard potential of −2.375V vs. RHE, a low equivalent weight of 12.15 g/mole of electrons and a high melting point of 649° C. Compared to lithium, it is easy to handle, machine and dispose. Because of its greater relative abundance, it is lower in cost as a raw material than lithium and magnesium compounds are generally of lower toxicity than lithium compounds. All of these properties coupled with magnesium's reduced sensitivity to air and moisture compared to lithium, combine to make magnesium an attractive alternative to lithium as an anode material.

Sulfur is an attractive cathode material due to its ready availability, low cost, relative nontoxicity and low equivalent weight. Additionally, sulfur has a theoretical maximum capacity of 1675 mAh/g. Therefore, sulfur used as a cathodic material in combination with a magnesium anode could provide a high capacity, safe and economic battery, potentially suitable for use in EV.

Production of a battery having an anode based on magnesium as the active material and a cathode based on sulfur as the active material, requires an electrolyte system which will efficiently transport magnesium ions and which will not adversely affect a sulfur cathode active material. In performance as a cathode active material sulfur is reduced to sulfide and polysulfide discharge products. These discharge products must remain available for oxidation during a charging stage. Moreover, to obtain a viable magnesium sulfur battery, an effective Mg electrolyte transport system cannot be chemically reactive to sulfur. Additionally, in consideration of production of commercial batteries, an electrolyte that can be safely stored, transported and handled is desired.

The electrochemical behavior of a magnesium electrode in a polar aprotic electrolyte solution was reported by Lu et al. in the Journal of Electroanalytical Chemistry (466 (1999) pp 203-217). These authors concluded that the electrochemical behavior of Mg is different from that of Li in polar aprotic electrolyte solutions. Their investigation showed that in contrast to the case of lithium electrodes, surface films which form on the Mg electrode in the aprotic solvents do not transport Mg ions. Therefore, conventional electrolyte systems employed in lithium transport systems are not suitable for a cell having a magnesium anode. Since Mg ion transport is an essential requirement for any electrochemical cell based on a magnesium anode, other electrolyte systems have been investigated.

Gregory et al. (J. Electrochem. Soc., 137 (3), March, 1990, 775-780) reported electrolyte systems of alkylmagnesium halide-organoboron complexes in an ether solvent. Also reported were alkylmagnesium halide solutions to which aluminum halides were added. Mg dissolution and plating at very high current efficiencies, giving bright crystalline Mg deposits were obtained in these systems. However, a suitable cathode material, compatible with the electrolyte system was not reported.

The most commonly used magnesium electrolyte to date is an organometallic material such as phenyl magnesium chloride/aluminum chloride in tetrahydrofuran. However, these electrolyte mixtures are not likely to be of practical commercial utility due to air and moisture sensitivity characteristic of such Grignard-based materials. Moreover, the phenyl magnesium chloride/aluminum chloride electrolyte has limited anodic stability, and significantly, such materials are highly nucleophilic and intrinsically strong reducing agents. This chemical reactivity character is problematic, because to construct an electrochemical cell employing a Grignard type electrolyte, a cathode material which is essentially chemically inert to the Grignard is required. The number of cathode functional materials meeting this requirement are limited. To date there have been two demonstrated cathodes which are compatible with organometallic electrolytes.

Aurbach et al. (NATURE, 407, Oct. 12, 2000, 724-726) describes an Mg battery system containing a magnesium organohaloaluminate salt in tetrahydrofuran (THF) or a polyether of the glyme type as electrolyte and a $Mg_xMo_3S_4$ cathode based on a $Mo_3S_4$ Chevrel phase host material. A similar cathode material described as having a formula $Mg_{(0-2)}Mo_6S_{(8-n)}Se_n$ was also reported by Aurbach (Advanced Materials, 19, 2007, 4260-4267).

Yamamoto et al. (JP2007-233134) describe positive electrode active substances containing fluoro graphite or an oxide or halide of a metal element such as scandium, titanium, vanadium, chromium, manganese iron, cobalt, nickel, copper and zinc. The experimental examples are based on $MnO_2$.

However, the organometallic electrolytes employed in the above magnesium electrolyte systems are highly reactive with sulfur and are known to directly react with sulfur to form sulfides by nucleophilic attack (The Chemistry of the Thiol Group, Pt 1; Wiley, New York, 1974, pp 211-215). Therefore, in order to produce a Mg/S battery, a new electrolyte system which meets all the requirements for magnesium ion transport described previously while having low or no chemical reactivity toward sulfur is required.

U.S. Pre-Grant Publication No. 2009/0226809 to Vu et al. describes a cathode for a lithium-sulfur battery (Abstract). A metal oxide selected from Group I and II metals is included in the composition of a sulfur cathode composition [0012]. The anode contains lithium and the electrolyte described is composed of a lithium salt in a nonaqueous solvent system [0032].

U.S. Pre-Grant Publication No. 2008/0182176 to Aurbach et al. describes an electrochemical cell having a magnesium anode and an intercalation cathode having a modified Chevrel phase. The Chevrel phase compound is represented by the formula $Mo_6S_{8-y}Se_y$ (y is greater than 0 and less than 2) or $M_xMo_6S_8$ (x is greater than 0 and less than 2). The electrolyte is represented by the formula $Mg(AlR_xCl_{4-x})_2$ and/or $(MgR_2)_x$—$(AlCl_{3-n}R_n)_y$ wherein R is methyl, ethyl, butyl, phenyl and derivatives thereof, n is greater than 0 and lower than 3, x is greater than 0 and lower than 3 and y is greater than 1 and lower than (Claim 3) in an ether solvent.

U.S. Pat. No. 7,316,868 to Gorkovenko describes an electrochemical cell having a lithium anode, a cathode of an electroactive sulfur containing composition and a nonaqueous electrolyte containing a lithium salt and a solvent mixture of dioxolane and one or more of 1,2-dialkoxyalkanes of 5 or 6 carbons and 1,3-dialkoxyalkanes of 5 or 6 carbon atoms (Claim 1). Electroactive sulfur compounds include elemental sulfur and organic compounds having sulfur and carbon atoms (Col. 4, lines 10-26).

U.S. Pat. No. 7,189,477 to Mikhaylik describes an electrochemical cell having a lithium anode, a cathode of a sulfur containing material and an electrolyte system composed of a lithium salt (Col. 4, lines 5-22) and a non-aqueous oxygen containing organic solvent selected from acyclic ethers, cyclic ethers, polyethers and sulfones.

U.S. Pat. No. 7,029,796 to Choi et al. describes a lithium sulfur battery having a cathode of an agglomerated complex of sulfur and conductive agent particles (Claim 1). A solid or liquid electrolyte can be employed and a liquid electrolyte is a nonaqueous organic solvent and a lithium salt (Col. 8, lines 43-58).

U.S. Pat. No. 6,733,924 to Skotheim et al. describes lithium sulfur battery wherein the lithium is protected by a surface coating of a metal such as copper, magnesium, aluminum, silver, etc. (Col. 12, lines 25-28). The electrolyte may be comprised of ionic salts in a non-aqueous solvent, gel polymer or polymer. Ionic electrolyte salts are lithium salts (Col. 15, line 26 to Col. 16, line 27).

U.S. Pat. No. 6,420,067 to Yoshioka describes a hydrogen storage negative electrode being a Mg alloy of Ni, Zn, and Zr (Abstract). The positive electrode is composed of a metal oxide (Col. 3, lines 17-19) and an aqueous electrolyte Col. 7, lines 16-18).

U.S. Pat. No. 6,265,109 to Yamamoto et al. describes air batteries with a negative electrode of a magnesium alloy (Col. 4, lines 9-33). The electrolyte is composed of an acid amide and a second solvent selected from dimethyl acetoamide, acetonitrile, ethylene carbonate, propylene carbonate and γ-butyrolactam (Col. 3, lines 1-15) and magnesium salt of a halogenide or a perchlorate.

U.S. Pat. No. 5,506,072 to Griffin et al. describes a battery having a cathode of finely divided sulfur and finely divided graphite packed about a solid graphite electrode (Col. 3, lines 48-51), an anode containing magnesium and an electrolyte of a corresponding magnesium halide and ionic sulfide as an aqueous electrolyte solution (Col. 3, line 65-Col. 4, line 1).

U.S. Pat. No. 4,020,242 to Okazaki et al. describes a primary cell containing a spacer which contains electrolyte and reduces its apparent volume when pressure is applied by volume increase of the cathode or anode (Abstract). A cell composed of a lithium anode and a cathode of carbon fluoride, silver chromate, manganese dioxide, cupric oxide or vanadium pentoxide and a nonaqueous electrolyte is described (Claim 15).

U.S. Pat. No. 3,849,868 to Jost describes a battery having a container of a composite metal laminate having a layer of magnesium bonded to a laminate material (Abstract). A graphite rod serves as the cathode (Col. 4, line 66 to Col. 5, line 3) and an electrolyte mixture contains manganese dioxide, finely divided carbon and a chromate in an aqueous solution of a bromide salt (Col. 4, lines 48-59).

U.S. Pat. No. 3,658,592 to Dey describes an electric cell having an anode of a light metal (Col. 1, lines 63-67), a cathode of a metal chromate (Col. 1, lines 68-72) and a non-aqueous electrolyte containing inorganic salts of light metals in organic solvents (Col. 1, line 73 to Col. 2, line 9). Magnesium is listed as a light metal.

JP 2004-259650 to Fumihito describes a battery having a magnesium anode and an intercalation cathode of a transition metal (Abstract). A cathode of vanadium pentoxide and graphite is described in Example 1. The electrolyte is a polymer gel containing a phenyl magnesium halide in tetrahydrofuran.

JP 2004-265675 to Hideyuki et al. describes a test cell constructed with a sulfur containing anode and a negative electrode of magnesium metal. Magnesium bis(trifluoromethylsulfonyl)imide in γ-butyrolactone is employed as an electrolyte system.

Aurbach et al. (The Chemical Record, Vol. 3, 61-73 (2003)) describes a study of a $(Bu_2Mg_x)$—$(AlCl_2Et)_y$ system in tetrahydrofuran and reports isolation of single crystals which were identified by XRD analysis as having the following structure:

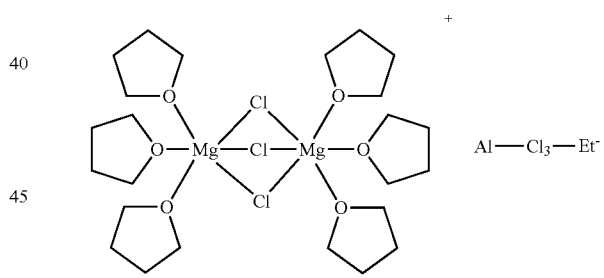

Aurbach reports that the isolated crystals were inactive with regard to magnesium deposition and describes that Mg could be reversibly deposited from the residual solutions remaining after removal of the precipitated crystals.

In an earlier report of this work (Journal of the Electrochemical Society, 149 (2) A115-A121 (2002)) Aubach reported that the isolated crystals when redissolved in tetrahydrofuran and fresh dibutyl magnesium in hexane added, Mg could be electrochemically deposited and dissolved.

From a practical point of view, with regard to production and use of a commercial battery, electrolyte systems containing agents such as dibutyl magnesium are problematic because of corrosivity, inhalation hazard, flammability and moisture sensitivity.

None of the above documents discloses a practically functional electro-chemical device having an anode containing a magnesium, a cathode containing sulfur and a stable and safe electrolyte system which is effective for the transport of Mg ions and compatible both with an Mg containing active material electrode and also a sulfur containing active material electrode.

SUMMARY OF THE INVENTION

One object of the present invention is to provide an electrolyte system for an electrochemical device having a magnesium anode which is suitable in performance, ease of manufacture, safety and cost and thus be suitable for use in a commercial battery.

A second objective of the present invention is to provide an electrolyte system for an electrochemical device having a magnesium anode and a cathode containing sulfur which is stable, safe and facile to handle in a production environment.

A third objective of the present invention is to provide a magnesium sulfur battery which has excellent performance, low cost and is safe to produce and handle.

A fourth object of the present invention is to provide a method for preparing an electrochemical device having an anode containing magnesium as the active material and a compatible, high performance nonaqueous electrolyte system which is stable, safe and easy to handle.

This and other objects, individually or in combinations thereof, have been achieved by the present invention, a first embodiment of which includes an electrochemical device, comprising:

an anode comprising magnesium;
a cathode stable to a voltage of at least 3.2 V relative to a magnesium reference; and
an electrolyte;
wherein
the electrolyte comprises an electrochemically active salt, which is obtained by:
admixing a magnesium salt of formula (I), formula (II) or a mixture thereof:

$$RMgX \qquad (I)$$

$$R_2Mg \qquad (II)$$

with an aluminum compound of formula (III), formula (IV) or a mixture thereof:

$$AlX_3 \qquad (III)$$

$$AlR'X_2 \qquad (IV)$$

in an ether solvent,
wherein
R is $C_1$ to $C_{10}$ alkyl, optionally substituted phenyl, $NR_2''$ or $OR'''$,
R'' is $C_1$ to $C_{10}$ alkyl, optionally substituted phenyl, a polyaromatic group or $SiR_3'''$,
R''' is independently $C_1$ to $C_{10}$ alkyl or optionally substituted phenyl,
X is F, Cl, Br or I, and
and
separating the formed electrochemically active salt from the ether solvent mixture.

A second embodiment of the present invention provides an electrochemical device, comprising:
an anode comprising magnesium;
a cathode comprising sulfur; and
an electrolyte comprising a solvated magnesium ion dimer of formula (V):

$$[Mg_2X_3]^+ \qquad (V)$$

wherein X is F, Cl, Br or I.

A third embodiment of the present invention provides an electrochemical device comprising:
an anode comprising magnesium;
a cathode comprising sulfur; and
an electrolyte;
wherein
the electrolyte comprises an electrochemically active salt, which is obtained by:
admixing a magnesium salt of formula (I), formula (II) or a mixture thereof:

$$RMgX \qquad (I)$$

$$R_2Mg \qquad (II)$$

with an aluminum compound of formula (III), formula (IV) or a mixture thereof:

$$AlX_3 \qquad (III)$$

$$AlR'X_2 \qquad (IV)$$

in an ether solvent,
wherein
R is $C_1$ to $C_{10}$ alkyl, optionally substituted phenyl, $NR_2''$ or $OR'''$,
R'' is $C_1$ to $C_{10}$ alkyl, optionally substituted phenyl, or $SiR_3'''$,
R''' is independently $C_1$ to $C_{10}$ alkyl or optionally substituted phenyl,
X is F, Cl, Br or I, and
separating the formed electrochemically active salt from the ether solvent mixture; and
dissolving the separated electrochemically active salt in a fresh ether solvent.

A fourth embodiment of the present invention provides a method for preparing an electrochemical device, comprising:
connecting an anode comprising magnesium and a cathode stable to a voltage of at least 3.2 V relative to a magnesium reference via an external electrically conductive structure; and
contacting the anode and cathode with an electrolyte comprising:
an electrochemically active salt, which is obtained by:
admixing a magnesium salt of formula (I), formula (II) or a mixture thereof:

$$RMgX \qquad (I)$$

$$R_2Mg \qquad (II)$$

with an aluminum compound of formula (III), formula (IV) or a mixture thereof:

$$AlX_3 \qquad (III)$$

$$AlR'X_2 \qquad (IV)$$

in an ether solvent,
wherein
wherein
R is $C_1$ to $C_{10}$ alkyl, optionally substituted phenyl, $NR_2''$ or $OR'''$,
R'' is $C_1$ to $C_{10}$ alkyl, optionally substituted phenyl, or $SiR_3'''$,
R''' is independently $C_1$ to $C_{10}$ alkyl or optionally substituted phenyl,
X is F, Cl, Br or I, and
separating the formed electrochemically active salt from the ether solvent mixture;

optionally washing the separated salt with solvent, recrystallizing the separated salt or washing and recrystallizing the separated salt; and dissolving the separated electrochemically active salt, optionally washed, recrystallized or washed and recrystallized, in a fresh ether solvent.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DETAILED DESCRIPTION OF THE INVENTION

Figure 1:
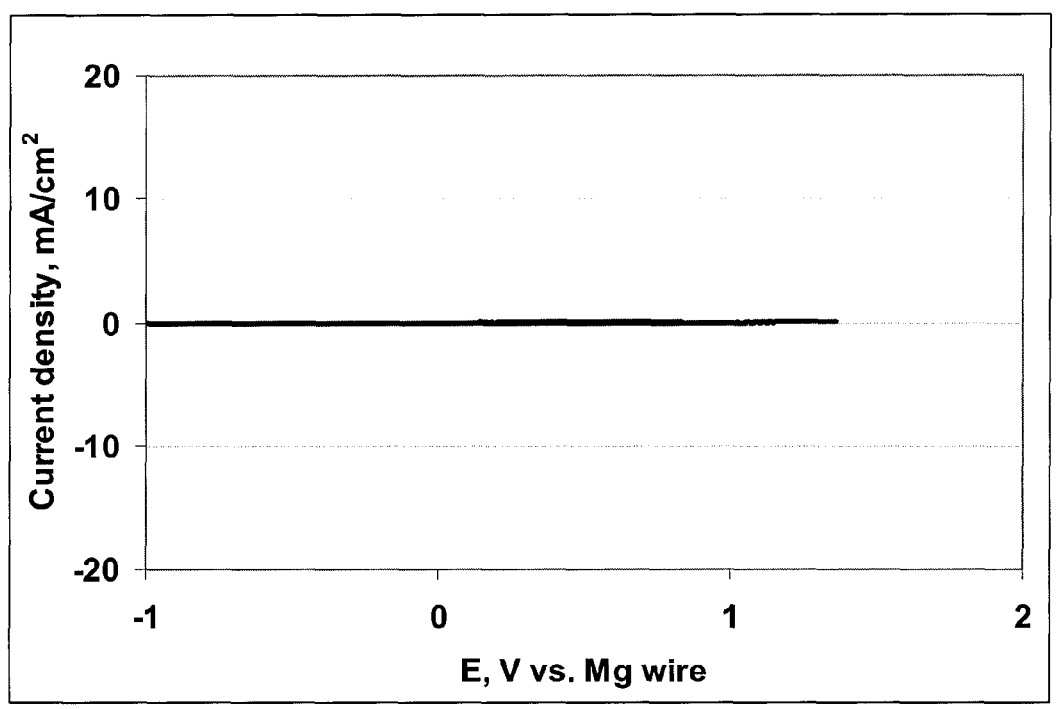
FIG. 1 shows the results of cyclicvoltammogram study of Mg deposition from $Mg(TFSI)_2$.

Applicants have recognized that to successfully prepare a magnesium-sulfur battery or electrochemical device, an effective magnesium ion transport electrolyte system which is stable to reduction on metallic magnesium and not nucleophilically reactive toward sulfur is required. Stability to reduction on magnesium is necessary to prevent formation of passivating films on the surface of the magnesium which inhibit passage of the magnesium ion. Additionally, to be commercially viable, the device should contain an electrolyte system that is significantly improved in safety, stability and ease of handle in a production environment in comparison to the conventional Mg electrolytes based on Grignard chemistry. Applicants investigated the voltammetric behavior of bis (trifluormethylsulfonyl)magnesium chloride described as in JP 2004-265675 and found that this material is not compatible with magnesium and is in fact reduced by magnesium. This behavior is shown in FIG. 1.

Recognizing the above stated requirements, Applicants have searched for possible suitable electrolyte systems and have described magnesium salts of non-nucleophilic bases containing nitrogen for utility as components of an electrolyte system for the transport of magnesium ions in related U.S. application Ser. No. 12/758,343.

Hexamethyl disilazide magnesium chloride is known to reversibly deposit and dissolve Mg. Liebenow et al. (Electrochem. Com. 2000, 641-645) describe a high reoxidation efficiency of magnesium electrodeposited from solutions of organomagnesium halides and amidomagnesium halides. Conductivity data in THF for N-methylanilylmagnesium bromide, pyrrylmagnesium bromide and bis(trimethylsilyl)magnesium chloride (hexamethyl disilazide magnesium chloride) was reported along with a cyclic voltammogram for bis(trimethylsilyl)magnesium chloride. However, it was reported that a complete reoxidation of magnesium deposited from bis(trimethylsilyl)-magnesium chloride could not be achieved and some percent of electrochemical active magnesium was lost per cycle.

The present inventors investigated the electrolytic behavior of bis(trimethylsilyl)imido magnesium chloride in comparison to a conventional phenylmagnesium chloride/$AlCl_3$ electrolyte in THF solution. Analysis of cyclic voltammetry data showed that the coulombic efficiency (CE) of Mg deposition/dissolution was 100% at three different scan rates (5, 25 and 100 m V/sec).

Figure 2:
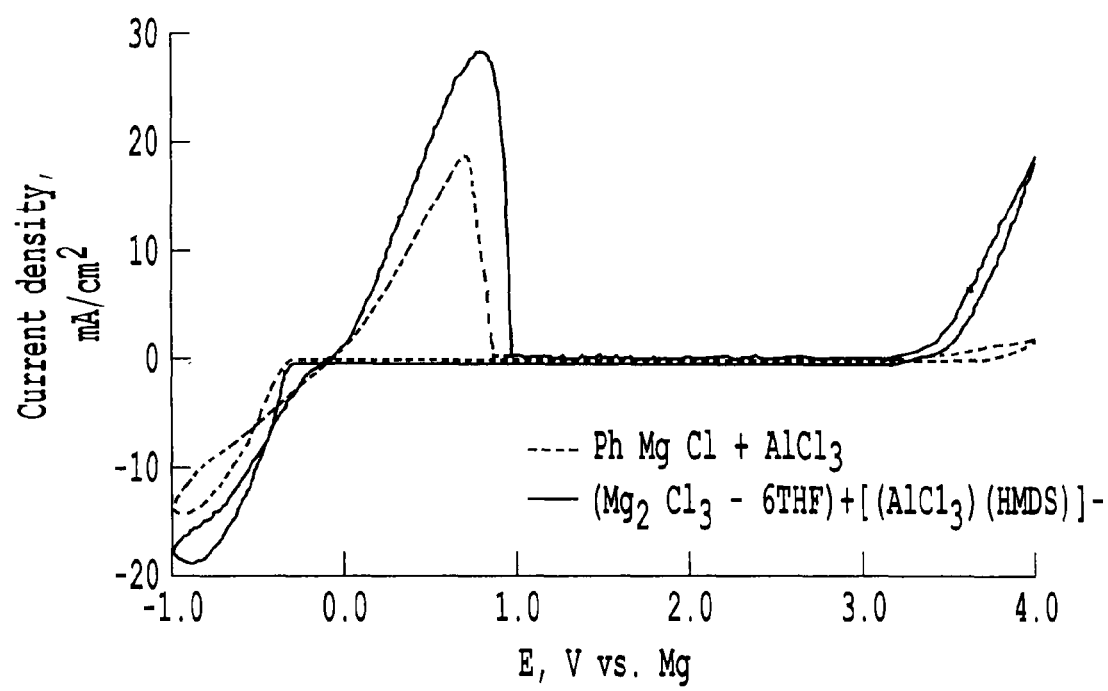
FIG. 2 shows the cyclicvoltammogram study of $(Mg_2Cl_3.6THF)^+[AlCl_3(HMDS)]^-$ in comparison to (Ph-MgCl+$AlCl_3$).

Hexamethyl disilazide magnesium chloride (HMDSMC) had a higher Mg deposition overpotential and lower current density compared to the conventional Mg electrolyte. The inset portion of FIG. 2 shows the Mg deposition overpotential is –0.40V for HMDSMC while the overpotential for the conventional system is –0.33V. Unexpectedly, the Inventors discovered that when aluminum chloride was combined with the HMDSMC, the performance of the system was significantly improved. As shown in FIG. 2, addition of $AlCl_3$ to HMDSMC resulted in a decrease of the Mg deposition overpotential from –0.40 to –0.29 V, thus making it comparable to the –0.33 value of the conventional system. Thus, the HMDSMC/$AlCl_3$ electrolyte showed higher current density and lower overpotential compared to HMDSMC or PhMgCl+$AlCl_3$ systems. The inventors concluded that HMDSMC/$AlCl_3$ electrolyte would likely result in higher cell voltage and therefore higher energy density when adapted in a practical battery system.

Upon further investigation of the HMDSMC/$AlCl_3$ electrolyte, an electrochemically active crystalline material was isolated and identified as having the chemical structure of formula (VIII):

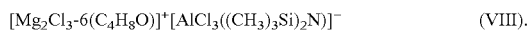

$$[Mg_2Cl_3\text{-}6(C_4H_8O)]^+[AlCl_3((CH_3)_3Si)_2N)]^- \quad (VIII).$$

X-ray diffraction analysis indicated the structure of the magnesium cation specie as a symmetric dimer as shown. When the crystalline material was redissolved in fresh THF, reversible Mg deposition and dissolution was observed.

Figure 3:
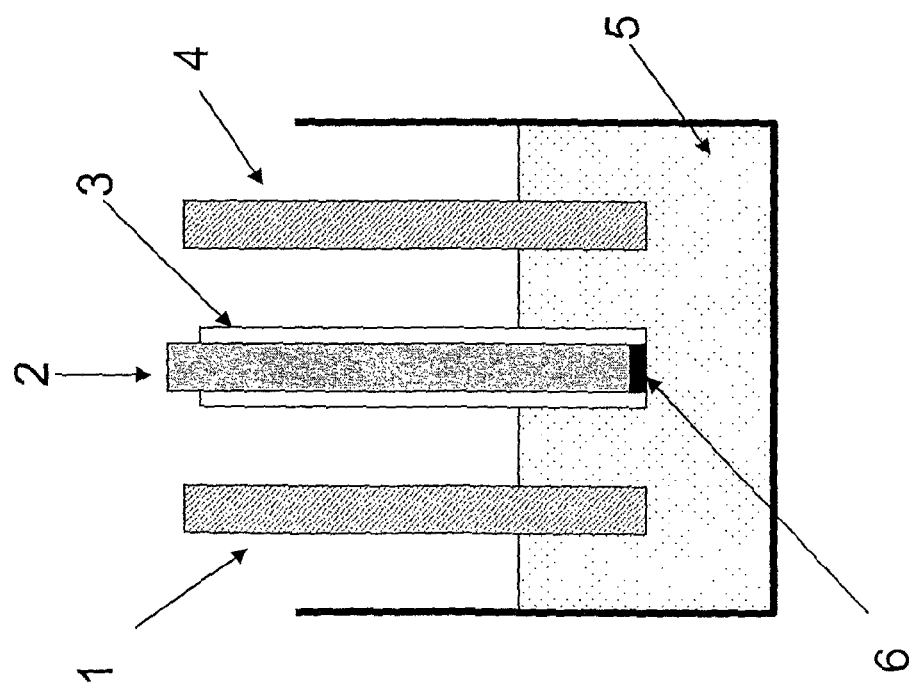
FIG. 3 shows a diagram of the MgS electrochemical device of Example 6.
Figure 4:
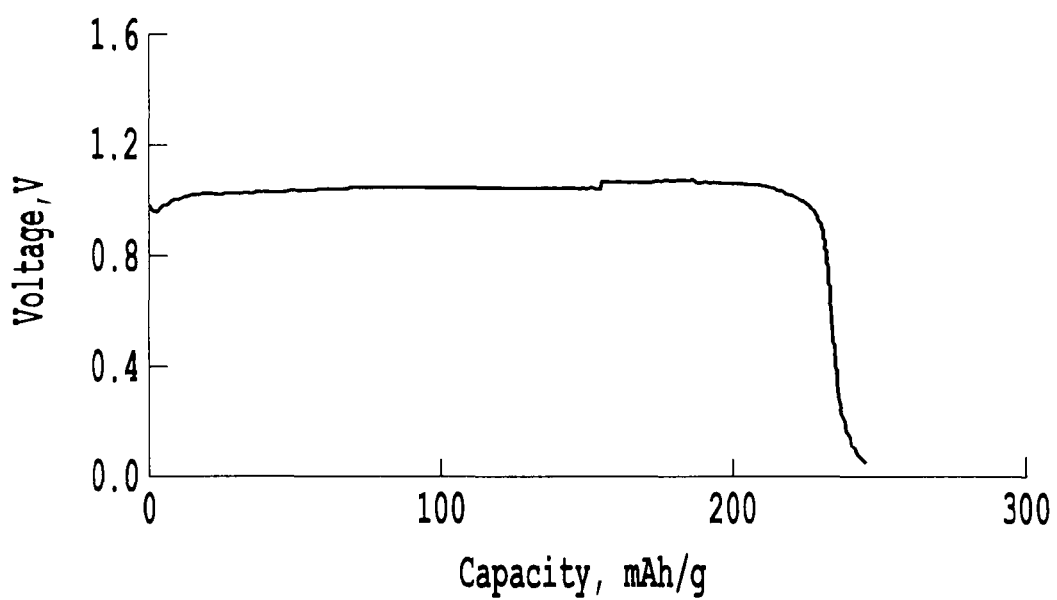
FIG. 4 shows the electrochemical performance of the electrochemical device of Example 6.

An electrochemical cell as shown in FIG. 3 was constructed as described in Example 6, and the electrochemical performance of the 3-electrode cell is shown in FIG. 4. As shown in FIG. 4 the discharge behavior of the sulfur electrode demonstrates that a functional magnesium sulfur battery containing the electrolyte system was feasible. As shown in FIG. 2 the claimed electrolyte system would be compatible with any cathode active material which is stable to a voltage of at least 3.2 V relative to a magnesium reference.

Recognizing the possible universal significance of the Mg dimer ion species, the inventors have investigated other chemical systems to determine whether ion species the same as or similar to the Mg dimer of Formula VIII having electrochemical activity may be produced.

General systems investigated include:
(1) RMgCl+$AlCl_3$
(2) RMgCl+$R_xAlCl_y$ where x+y=3
(3) $R_2Mg$+$AlCl_3$
(4) $R_2Mg$+$R_xAlCl_y$ where x+y=3

Figure 5:
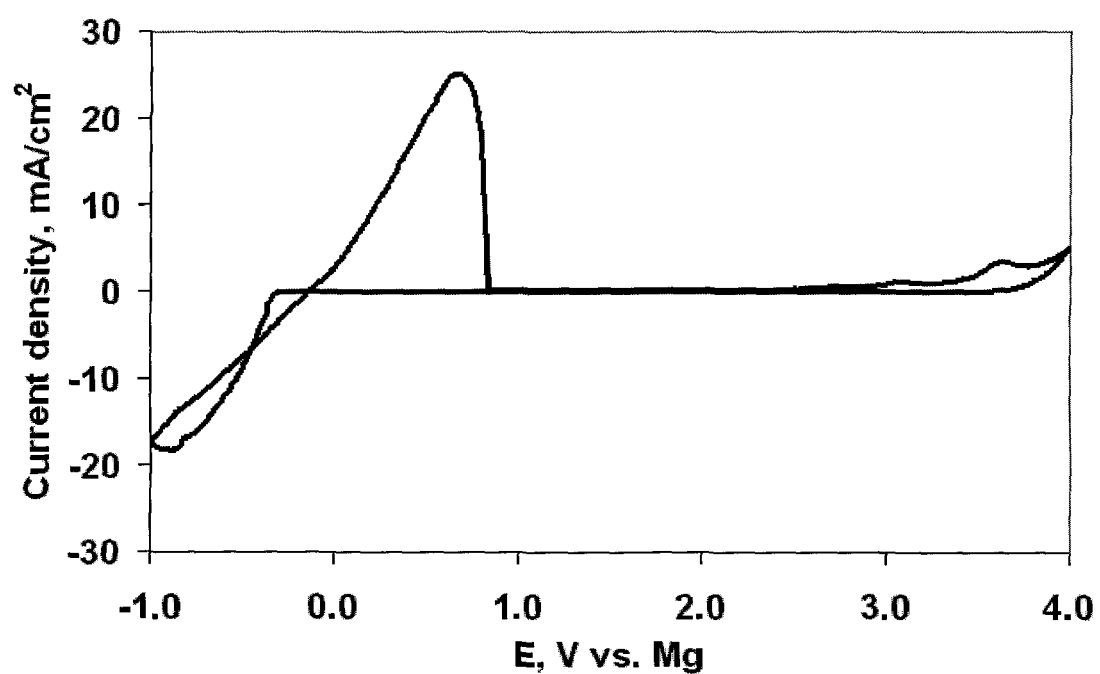
FIG. 5 shows the cyclic voltammogram $[Mg_2Cl_3\text{-}6(C_4H_8O)]^+[AlCl_bR_{(4-b)}]^-$ in 0.2M THF solution.

As described in Example 6 the inventors have surprisingly discovered that an electrochemically active salt can be obtained when PhMgCl and AlCl₃ are mixed in a 2:1 ratio in THF, stirring for at least 48 hours and then treating the solution with hexane. The white crystalline solid thus obtained has been analyzed by X-ray crystallography, NMR ($^1$H, $^{13}$C, $^{27}$Al), and electrochemistry. The inventors have determined that the crystalline salt is stable to drying and is electrochemically active (FIG. 5). Structural analysis indicates that the salt comprises a THF solvated Mg dimmer cation of formula (V)

$$[Mg_2X_3]^+ \quad (V)$$

wherein X is Cl. The counter ion may be a structure of formula (VI)

$$[AlCl_bR_{(4-b)}]^- \quad (VI)$$

wherein R is phenyl and b is 1, 2 or 3. The crystal structure of a major structural component of the isolated salt is shown in FIG. 11 and has the formula $[Mg_2Cl_3\cdot 6THF]^+[Al(C_6H_5)_2Cl_2]^-$.

Figure 10:
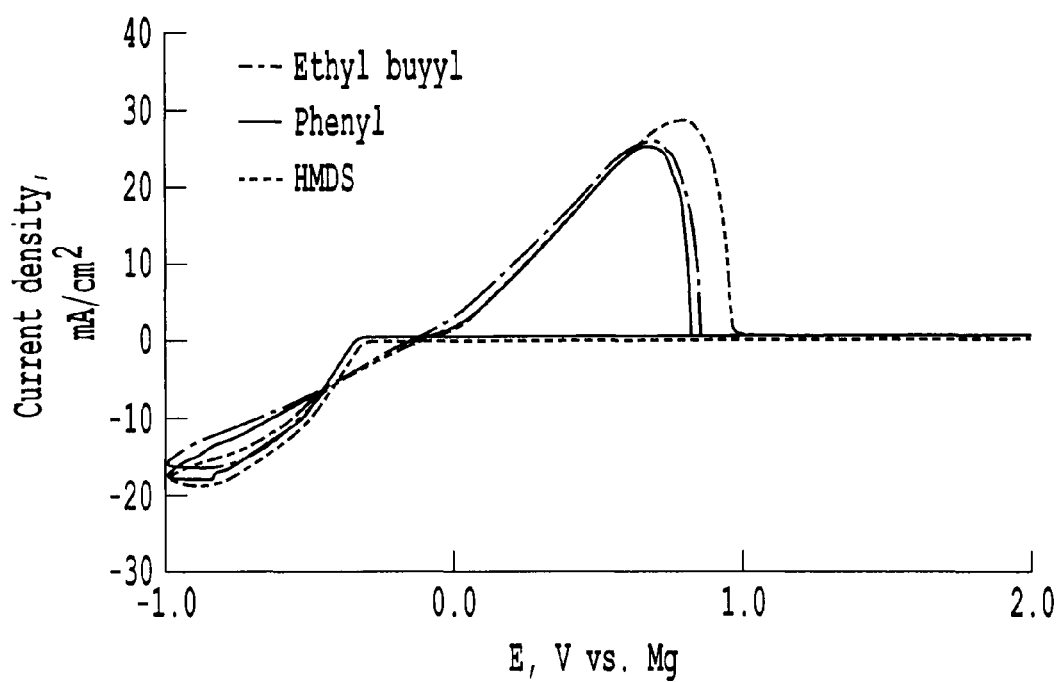
FIG. 10 shows the cyclicvoltammogram study of the crystals $[Mg_2Cl_3\text{-}6THF]^+[HMDSAlCl_3]^-$, $[Mg_2Cl_3\text{-}6THF]^+[AlPh_aCl_{4-a}]^-$ (a=1,2,3), and $[Mg_2Cl_3\text{-}6THF]^+[AlEtBu_bCl_{3-b}]^-$ (b=1,2)

A similar electrochemically active material may be separated from an ether mixture of Bu₂Mg+EtAlCl₂. Comparison of electrochemical activity as shown in FIG. 10 indicates that the active species in these systems may be the same or very similar.

This result is especially surprising and unexpected in view of a previous report which describes isolation of crystalline salts from similar chemical systems and the indication that the isolated salts are not electrochemically active [Aurbach et al., J. Electrochemical Soc., 149 (2) A115-121 (2002)].

As a result of this investigation Applicants have discovered the present invention as described in the appended Claims and as follows.

A first embodiment of the invention includes an electrochemical device, comprising:
an anode comprising magnesium;
a cathode stable to a voltage of at least 3.2 V relative to a magnesium reference; and
an electrolyte;
wherein
the electrolyte comprises an electrochemically active salt, which is obtained by:
admixing a magnesium salt of formula (I), formula (II) or a mixture thereof:

$$RMgX \quad (I)$$

$$R_2Mg \quad (II)$$

with an aluminum compound of formula (III), formula (IV) or a mixture thereof:

$$AlX_3 \quad (III)$$

$$AlR'X_2 \quad (IV)$$

in an ether solvent,
wherein
R is $C_1$ to $C_{10}$ alkyl, optionally substituted phenyl, NR₂''' or OR''',
R' is $C_1$ to $C_{10}$ alkyl, optionally substituted phenyl, a polyaromatic group or SiR₃''',
R''' is independently $C_1$ to $C_{10}$ alkyl or optionally substituted phenyl,
X is F, Cl, Br or I, and
separating the formed electrochemically active salt from the ether solvent mixture.

A second embodiment of the present invention provides an electrochemical device, comprising:
an anode comprising magnesium;
a cathode comprising sulfur; and
an electrolyte comprising a solvated magnesium ion dimer of formula (V):

$$[Mg_2X_3]^+ \quad (V)$$

wherein X is F, Cl, Br or I.

A third embodiment of the present invention provides an electrochemical device comprising:
an anode comprising magnesium;
a cathode comprising sulfur; and
an electrolyte;
wherein
the electrolyte comprises an electrochemically active salt, which is obtained by:
admixing a magnesium salt of formula (I), formula (II) or a mixture thereof:

$$RMgX \quad (I)$$

$$R_2Mg \quad (II)$$

with an aluminum compound of formula (III), formula (IV) or a mixture thereof:

$$AlX_3 \quad (III)$$

$$AlR'X_2 \quad (IV)$$

in an ether solvent,
wherein
R is $C_1$ to $C_{10}$ alkyl, optionally substituted phenyl, NR₂'' or OR''',
R'' is $C_1$ to $C_{10}$ alkyl, optionally substituted phenyl, or SiR₃''',
R''' is independently $C_1$ to $C_{10}$ alkyl or optionally substituted phenyl,
X is F, Cl, Br or I, and
separating the formed electrochemically active salt from the ether solvent mixture; and
dissolving the separated electrochemically active salt in a fresh ether solvent.

A fourth embodiment of the present invention provides a method for preparing an electrochemical device, comprising:
connecting an anode comprising magnesium and a cathode stable to a voltage of at least 3.2 V relative to a magnesium reference via an external electrically conductive structure; and
contacting the anode and cathode with an electrolyte comprising:
an electrochemically active salt, which is obtained by:
admixing a magnesium salt of formula (I), formula (II) or a mixture thereof:

$$RMgX \quad (I)$$

$$R_2Mg \quad (II)$$

with an aluminum compound of formula (III), formula (IV) or a mixture thereof:

$$AlX_3 \quad (III)$$

$$AlR'X_2 \quad (IV)$$

in an ether solvent,
wherein
R is $C_1$ to $C_6$ alkyl, optionally substituted phenyl, NR₂''H or OR''',
R'' is $C_1$ to $C_6$ alkyl, optionally substituted phenyl, or SiR₃ₘ;
R''' is independently $C_1$ to $C_6$ alkyl or optionally substituted phenyl,
X is F, Cl, Br or I, and
a is 1 or 2; and
separating the formed electrochemically active salt from the ether solvent mixture.

Examples of cathode active materials according to the invention may include sulfur, $MnO_2$ and a Chevrel compound having a formula $Mg_xMo_6T_n$, wherein x is a number from 0 to 4, T is sulfur, selenium or tellurium, and n is 8.

A $MnO_2$ cathode is known in the art and is described for example in JP2007-233134.

Chevrel compounds having a formula $Mg_xMo_6T_n$, wherein x is a number from 0 to 4, T is sulfur, selenium or tellurium are described in NATURE, 407, Oct. 12, 2000, 724-726.

Cathodes containing sulfur as the active ingredient are known in the art and are described for example in U.S. Pat. No. 6,733,924, U.S. Pat. No. 7,029,796 and U.S. Pre-Grant Publication No. 2009/0226809.

Importantly, sulfur is such a cathode active material and the invention therefore allows for the construction of an electrochemical device having sulfur as the active ingredient of a cathode. At the same time, the electrolyte system of the present invention is equal to conventional systems as a Mg ion electrolyte with an anode containing magnesium as the active ingredient.

Accordingly, a functional Mg/S electrochemical device may be constructed according to the present invention.

Therefore, the present invention provides an electrochemical device comprising an anode containing magnesium, a cathode stable to a voltage of at least 3.2 V relative to a magnesium reference and an electrolyte obtained by admixture of a magnesium salt according to formulae (I) and (II) and an aluminum compound of formulae (III) and (IV) in an ether solvent. Following mixing for a period of time which may be dependent on the particular reaction components, an electrochemically active salt is separated from the reaction mixture. The separated salt may be washed free of the reaction mixture and or recrystallized.

Applicants have determined unexpectedly that the separated salt is stable. Moreover as it is free of compounds such as dialkyl magnesium compounds, for example, dibutyl magnesium, it is much safer to handle.

The R substituent of formulae (I) and (II) may be $C_1$ to $C_6$ alkyl, optionally substituted phenyl, $NR_2''$ or $OR'''$, where R" is $C_1$ to $C_6$ alkyl, optionally substituted phenyl, or $SiR_3'''$, and R''' is independently $C_1$ to $C_6$ alkyl or optionally substituted phenyl. In the substituent $NR_2''$ a may be 1 or 2. Preferably R is phenyl, ethyl or $N[Si(CH_3)_3]$ and most preferably R is phenyl or $N[Si(CH_3)_3]$.

In formula (I), X is F, Cl, Br or I, preferably Cl or Br and most preferably Cl. Magnesium chloride is most preferred in consideration of availability, cost and ease of handling.

The ether solvent may be one or more of tetrahydrofuran, ethylene glycol dimethyl ether and bis 2-methoxy ethyl ether in consideration of safety and ease of handling. Tetrahydrofuran may be most preferred, although other reaction requirements may dictate the necessity for an ether with different physical properties.

The anode containing magnesium as the active ingredient may be of any form known to one of ordinary skill in the art which is suitable for an electrochemical device according to the present invention.

In a particularly preferred embodiment, the present invention provides an electrochemical device having a cathode containing sulfur as an active ingredient, an anode having magnesium as the active ingredient and the electrolyte system comprising an electrolyte comprises an active solvated cation specie of formula (V)

$$[Mg_2X_3]^+ \quad (V)$$

wherein X is F, Cl, Br or I, most preferably Cl.

In a further particularly preferred embodiment of the present invention, the electrochemical device may have a cathode containing sulfur as an active ingredient, an anode having magnesium as the active ingredient and an electrolyte system wherein the cation specie of formula (V) is associated with an anion of formula (VI)

$$[AlCl_bR_{(4-b)}]^- \quad (VI)$$

wherein

R is $C_1$ to $C_6$ alkyl, optionally substituted phenyl, $NR_2''$ or $OR'''$,

R" is $C_1$ to $C_6$ alkyl, optionally substituted phenyl, or $SiR_3'''$,

R''' is independently $C_1$ to $C_6$ alkyl or optionally substituted phenyl,

X is F, Cl, Br or I, and b is 1, 2 or 3.

The electrochemical device according to the invention may be constructed by methods which are conventionally known. In general the method may include a method for preparing an electrochemical device, comprising:

connecting an anode comprising magnesium and a cathode stable to a voltage of at least 3.2 V relative to a magnesium reference via an external electrically conductive structure; and contacting the anode and cathode with an electrolyte comprising:

an electrochemically active salt, which is obtained by:

admixing a magnesium salt of formula (I), formula (II) or a mixture thereof:

$$RMgX \quad (I)$$

$$R_2Mg \quad (II)$$

with an aluminum compound of formula (III), formula (IV) or a mixture thereof:

$$AlX_3 \quad (III)$$

$$AlR'X_2 \quad (IV)$$

in an ether solvent, wherein

R is $C_1$ to $C_{10}$ alkyl, optionally substituted phenyl, $NR_2''$ or $OR'''$, R" is $C_1$ to $C_{10}$ alkyl, optionally substituted phenyl, or $SiR_3'''$, R''' is independently $C_1$ to $C_{10}$ alkyl or optionally substituted phenyl, X is F, Cl, Br or I, and separating the formed electrochemically active salt from the ether solvent mixture.

In a preferred embodiment of the invention the ether solvent is tetrahydrofuran and in a further preferred embodiment, X is Cl.

The separated electrochemically active salt may be washed with conventionally known solvents and/or recrystallized from conventionally known solvents.

Having generally described this invention, a further understanding can be obtained by reference to certain specific examples which are provided herein for purposes of illustration only and are not intended to be limiting unless otherwise specified. Skilled artisans will recognize the utility of the devices of the present invention as a battery as well as the general utility of the electrolyte system described herein.

EXAMPLES

Example 1

In a glovebox, 1.574 ml of a 1.27 M solution of hexamethyl disilazide magnesium chloride in THF was added to 1.426 ml of dried THF in a screw capped vial. The resulting mixture was rapidly stirred. The solution was then allowed to stand for a few minutes and after standing, 2 ml of 0.5 M AlCl$_3$(0.5 eq) in THF was added. This mixture was stirred for 48 hours.

Example 2

In a glovebox, 3.17 ml of a 1.27 M solution of bishexamethyl disilazide magnesium in THF was added to 1.426 ml of dried THF in a screw capped vial. The resulting mixture was rapidly stirred. The solution was then allowed to stand for a few minutes and after standing, 2 ml of 0.5 M AlCl$_3$ (0.5 eq) in THF was added. This mixture was stirred for 48 hours.

Example 3

The following THF solutions were prepared:
0.40 M PhMgCl/0.2 M AlCl$_3$
0.40 M ((CH$_3$)$_3$Si)$_2$NMgCl
0.40 M ((CH$_3$)$_3$Si)$_2$NMgCl/0.2 M AlCl$_3$ Cyclicvoltammograms of each solution were obtained at a scan rate of 25 mV/sec employing a Pt disk as Working electrode; Mg wire as reference electrode and Mg ribbon as counter electrode.

The three cyclicvoltammograms are shown in FIG. 2. The claimed electrolyte combination is thus comparable in performance to conventional Grignard electrolytes.

Example 4

In a drybox, 15 ml of 0.5 M solution of aluminum trichloride (7.5 mmol) in THF was added to 50 ml flask. The aluminum trichloride solution was treated with 2 eq of 1.44 M THF solution of hexamethlydisilazide (HMDS)MgCl (10.417 ml, 15 mmol) (Synthonix, Inc.). The flask was capped and stirred rapidly for 48 hrs. The solution was transferred to 125 ml conical flask, The THF solution was layered with dry hexane (Aldrich, 80 ml). After 3 days, the white crystals were filtered and washed with hexane (30 ml) and vacuum dried to furnish 4.3 g of white crystalline material. When redissolved in fresh THF reversible Mg deposition and dissolution was observed.

Example 5

(Mg$_2$Cl$_3$.6THF)$^+$(Ph$_2$AlCl$_2$)$^-$ Electrolyte

PhMgCl and AlCl$_3$ were mixed in 2:1 ratio in THF and stirred for 48 hrs. The solution was crystallized by layering of hexane. The resulting white crystalline solid was analyzed by X-ray, NMR ($^1$H, $^{13}$C, $^{27}$Al), and electrochemistry.

Figure 9:
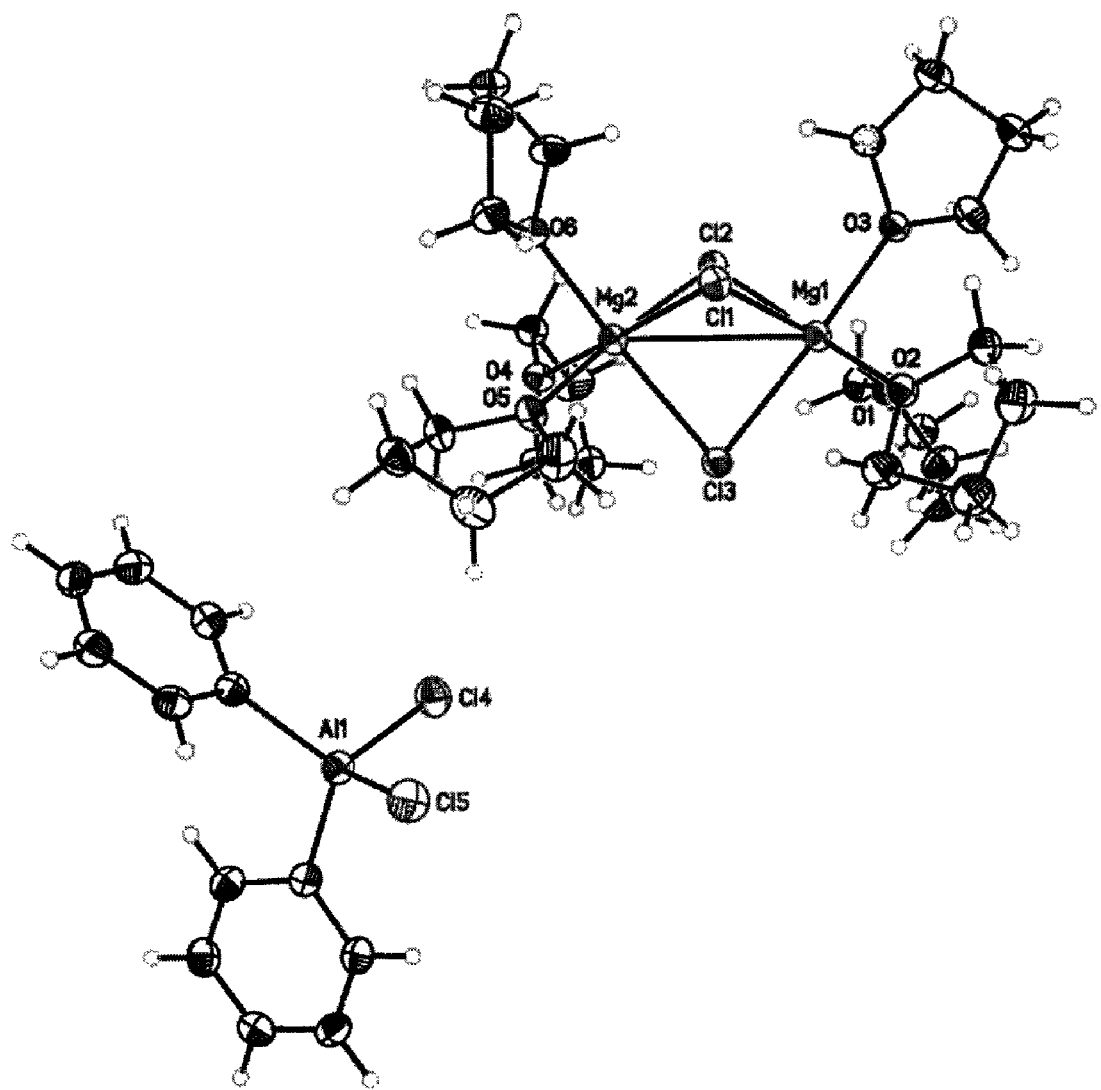
FIG. 9 shows the crystal structure of the major product $[Mg_2Cl_3\text{-}6THF]^+[AlPh_2Cl_2]^-$.

The white solid was dissolved in fresh THF to make 0.2M solution. FIG. 5 shows the electrochemical activity of the electrolyte. Reversible Mg deposition and dissolution can be observed from the electrolyte. Interestingly, the electrolyte shows two small oxidation peaks (at 3.1V and 3.6V), before the oxidation of bulk solution begins. This suggests that the electrolyte is composed of at least 3 different components, with different oxidative stability. One of the 3 components are identified by X-ray and has the structure of [Mg$_2$Cl$_3$-6THF]$^+$ [Al(C$_6$H$_5$)$_2$Cl$_2$]$^-$ as shown in FIG. 9.

Not wishing to be limited to the particular structure, but based on these results and our previous analysis (U.S. patent application Ser. No. 12/758,343), we assume the 3 products are [Mg$_2$Cl$_3$-6THF]$^+$[Al(C$_6$H$_5$)$_2$Cl$_2$]$^-$ (primary), [Mg$_2$Cl$_{3-6}$THF]$^+$[Al(C$_6$H$_5$)Cl$_3$]$^-$ (secondary) and [Mg$_2$Cl$_3$-6THF]$^+$[Al(C$_6$H$_5$)$_3$Cl]$^-$ (minor).

An arbitrary sphere of data were collected on a colorless block-like crystal, having approximate dimensions of 0.21× 0.16×0.10 mm, on a Bruker APEX-II diffractometer using a combination of ω- and φ-scans of 0.5°. Data were corrected for absorption and polarization effects and analyzed for space group determination. The structure was solved by direct methods and expanded routinely. The model was refined by full-matrix least-squares analysis of F$^2$ against all reflections. All non-hydrogen atoms were refined with anisotropic thermal displacement parameters. Unless otherwise noted, hydrogen atoms were included in calculated positions. Thermal parameters for the hydrogens were tied to the isotropic thermal parameter of the atom to which they are bonded (1.2×for aromatic and methylene). The crystallographic details for (Mg$_2$Cl$_3$.6THF)$^+$ (Ph$_2$AlCl$_2$)$^-$ is summarized in Table 1.

Figure 7:
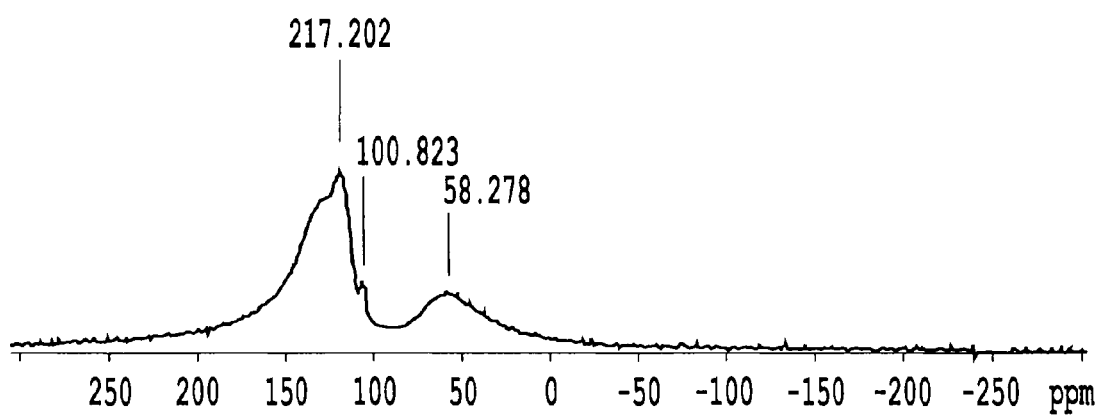
FIG. 7 shows the $^{27}Al$ NMR spectrum of the $[Mg_2Cl_3\text{-}6(C_4H_8O)]^+[AlCl_bR_{(4-b)}]^-$ crystal.
Figure 8:
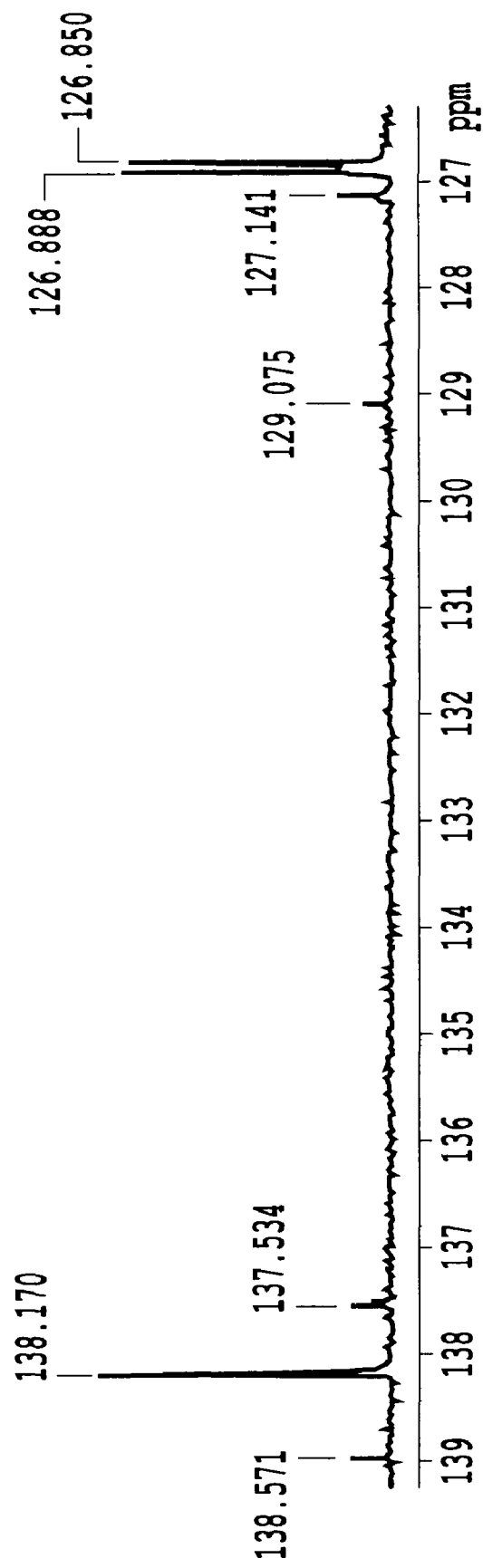
FIG. 8 shows the $^{13}C$ NMR spectrum of the $[Mg_2Cl_3\text{-}6(C_4H_8O)]^+[AlCl_bR_{(4-b)}]^-$ crystal.

This is consistent with the $^{27}$Al and $^{13}$C NMR results as well (FIGS. 7 and 8). In $^{13}$C NMR, in addition to the main broad peak at ~130 ppm, two additional peaks are observed at 117 ppm and 105 ppm. The broad peak at 58 ppm arises from the Al component in the probe used for the measurement.

The primary and secondary product can also be identified from $^{13}$C NMR spectrum in FIG. 8. The peaks from the major product appear at 138.179, 127.141, 126.889, and 126.850 ppm. The peaks from the secondary product are at 138.971, 137.534, 129.073, and 126.925 ppm. The minor product peaks do not appear in this spectrum probably due to the relatively small amount.

TABLE 1

Crystal data and structure refinement for (Mg$_2$Cl$_3$•6THF)$^+$ (Ph$_2$AlCl$_2$)$^-$.

| | |
|---|---|
| Identification code | (Mg$_2$Cl$_3$•6THF)$^+$ (Ph$_2$AlCl$_2$ |
| Empirical formula | C$_{36}$H$_{58}$AlCl$_5$Mg$_2$O$_6$ |
| Formula weight | 839.67 |
| Temperature | 100(2) K |
| Wavelength | 0.71073 A |
| Crystal system | triclinic |
| Space group | P-1 |
| Unit cell dimensions | a = 12.9569(3) Å   α = 77.7570(10)° |
| | b = 13.0714(3) Å   β = 85.9360(10)° |
| | c = 13.4709(3) Å   γ = 72.0740(10)° |
| Volume | 2121.33(8) Å$^3$ |
| Z | 2 |
| Density (calculated) | 1.315 g · cm$^{-3}$ |
| Absorption coefficient (μ) | 0.433 mm$^{-1}$ |
| F(000) | 888 |
| Crystal size | 0.21 × 0.16 × 0.10 mm$^3$ |
| θ range for data collection | 1.55 to 26.40° |
| Index ranges | −16 ≤ h ≤ 16, −16 ≤ k ≤ 16, −16 ≤ l ≤ 16 |
| Reflections collected | 29686 |
| Independent reflections | 8601 [R$_{int}$ = 0.0310] |
| Completeness to θ = 26.40° | 98.7% |
| Absorption correction | numerical |
| Max. and min. transmission | 1.0000 and 0.8890 |
| Refinement method | Full-matrix least-squares on F$^2$ |
| Data/restraints/parameters | 8601/0/451 |
| Goodness-of-fit on F$^2$ | 1.022 |
| Final R indices [I > 2σ(I)] | R$_1$ = 0.0331, wR$_2$ = 0.0735 |
| R indices (all data) | R$_1$ = 0.0478, wR$_2$ = 0.0797 |
| Largest diff. peak and hole | 0.730 and −0.313 e$^-$.A$^{-3}$ |

Example 6

All reagents were purchased from Synthonix. In a drybox, 15 ml of 0.5 M solution of aluminum trichloride (7.5 mmol) in THF was added to 50 mL flask. The aluminum trichloride solution was treated with 2 eq of 1.44 M THF solution of hexamethlydisilazide (HMDS)MgCl (10.417 mL, 15 mmol).

The flask was capped and stirred rapidly for 48 hrs. The solution was transferred to 125 mL conical flask, and the THF solution was layered with dry hexane (Aldrich, 80 mL). After 3 days, the white crystals were filtered and washed with hexane (30 mL) and vacuum dried to furnish 4.3 g of $(Mg_2Cl_3\text{-}6THF)^+[AlCl_3(HMDS)]^-$.

The white crystal was dissolved in THF to make 0.2M solution, and was used as the electrolyte in the 3-electrode cell shown in FIG. 3. The working electrode of this 3-electrode cell was made from a paste comprising elemental sulfur and finely divided carbon. The reference electrode and counter electrode were made from Mg metal. Using this cell, the electrochemical performance of the sulfur electrode in $(Mg_2Cl_3\text{-}6THF)^+[AlCl_3(HMDS)]^-$ was obtained as shown in FIG. 4. The discharge behavior of the sulfur electrode in the $(Mg_2Cl_3\text{-}6THF)^+[AlCl_3(HMDS)]^-$ electrolyte shown in FIG. 4 demonstrates the feasibility of a magnesium sulfur battery with the $(Mg_2Cl_3\text{-}6THF)^+[AlCl_3(HMDS)]^-$ electrolyte.

Example 7

In a drybox, 6 ml of 0.5 M solution of aluminum trichloride (2.5 mmol) in THF was added to 50 ml flask. The aluminum trichloride solution was treated with 2 eq of 2 M THF solution of Phenylmagnesium chloride (3 ml, 2.5 mmol). The flask was capped and stirred rapidly for 48 hrs. The THF solution was layered with dry hexane (Aldrich, 20 ml). After 3 days, the white crystals were filtered and washed with hexane (10 ml) and vacuum dried to furnish 4.3 g of $[Mg_2C_{13}\text{-}6THF]^+$ $[AlPh_aCl_{4-a}]^-$ (a=1, 2, 3).

Figure 6:
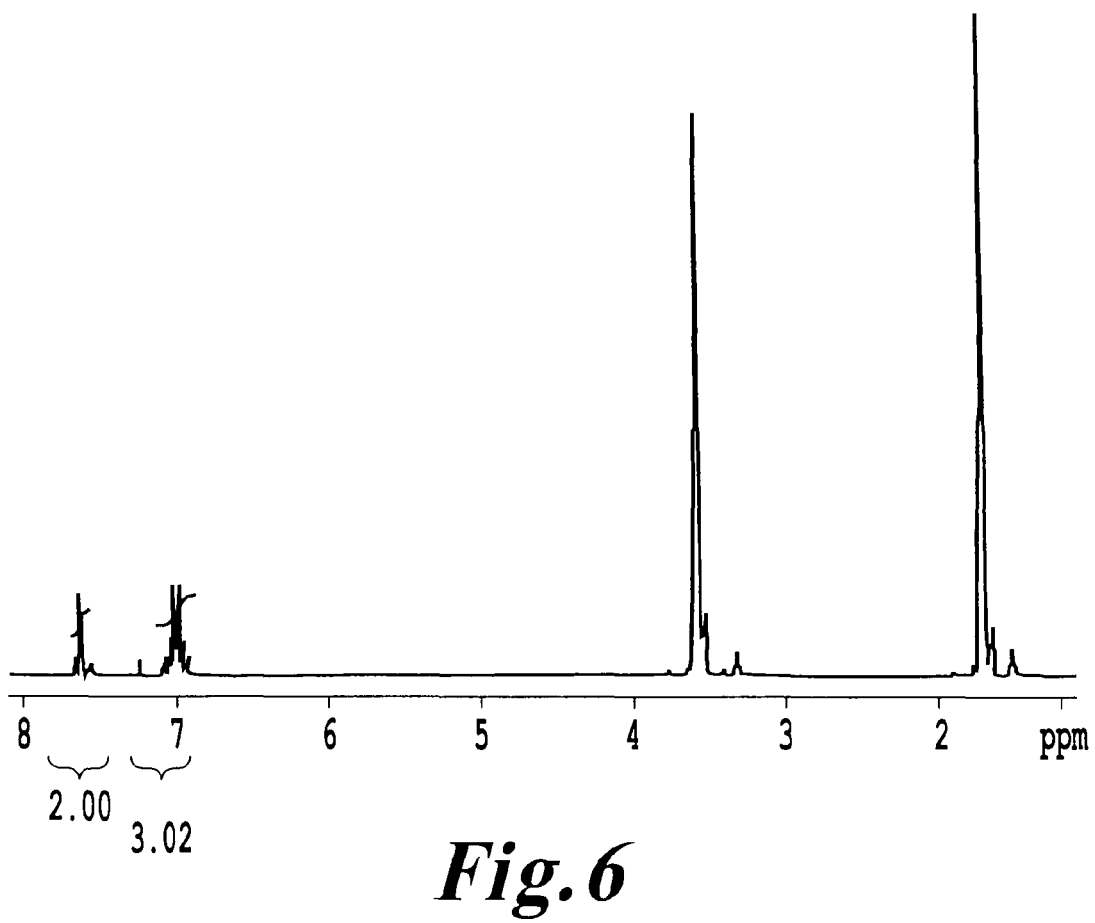
FIG. 6 shows the $^1H$ NMR spectrum of the $[Mg_2Cl_3\text{-}6(C_4H_8O)]^+[AlCl_bR_{(4-b)}]^-$ crystal.

The $^1H$ NMR spectrum of the separated salt is shown in FIG. 6. The cyclicvoltammogram is shown in FIG. 10.

Example 8

The procedure of Example 7 was followed except that $Bu_2Mg$ was used in place of Phenylmagnesium chloride and $EtAlCl_2$ was used in place of $AlCl_3$. The cyclicvoltammogram is shown in FIG. 10.

The invention claimed is:
1. An electrochemical device, comprising:
an anode comprising magnesium;
a cathode comprising elemental sulfur as a major component of an active ingredient; and
an electrolyte;
wherein
the electrolyte comprises an electrochemically active salt of a solvated cation species, prepared in a medium, the salt comprising a magnesium ion dimer of formula (V):

$$[Mg_2X_3]^+ \quad (V)$$

and
an anion of formula (VI):

$$[AlCl_bR_{(4-b)}]^- \quad (VI)$$

the electrochemically active salt having been crystallized, removed from the medium of preparation and redissolved in an ether solvent to obtain the electrolyte,
wherein
R is $C_1$ to $C_{10}$ alkyl, optionally substituted phenyl, $NR_2''$ or $OR'''$,
R'' is $C_1$ to $C_{10}$ alkyl, optionally substituted phenyl, a polyaromatic group or $SiR_3'''$,
R''' is independently $C_1$ to $C_{10}$ alkyl or optionally substituted phenyl,
X is F, Cl, Br or I, and
b is 1, 2, or 3.

2. The electrochemical device according to claim 1, wherein X is Cl.

3. The electrochemical device according to claim 1, wherein the ether solvent is selected from the group consisting of tetrahydrofuran, ethylene glycol, dimethyl ether and his 2-methoxy ethyl ether.

4. The electrochemical device according to claim 1, wherein R is at least one selected from the group consisting of methyl, ethyl, propyl, butyl and phenyl.

5. The electrochemical device according to claim 3, wherein the ether solvent is tetrahydrofuran.

6. The electrochemical device according to claim 1, wherein X is Cl, the ether solvent is tetrahydrofuran and the electrochemically active salt is of formula (VII):

$$[Mg_2Cl_3\text{-}6(C_4H_8O)]^+[AlCl_bR_{(4-b)}]^- \quad (VII)$$

wherein R and b are defined in claim 1.

7. The electrochemical device according to claim 1, wherein the cathode comprising elemental sulfur is stable to a voltage of at least 3.2 V relative to a magnesium reference.

8. The electrochemical device according to claim 1, wherein the cathode comprising elemental sulfur further comprises a finely divided carbon.

* * * * *